US006073603A

United States Patent [19]

Sumi et al.

[11] Patent Number: 6,073,603

[45] Date of Patent: Jun. 13, 2000

[54] VEHICULAR V-TYPE INTERNAL COMBUSTION ENGINE CYLINDER BLOCK STRUCTURE

[75] Inventors: Hiromi Sumi; Yoshiaki Hori, both of Saitama, Japan

[73] Assignee: Honda Giken Kogyo Kabushiki Kaisha, Tokyo, Japan

[21] Appl. No.: 08/964,858

[22] Filed: Nov. 5, 1997

[30] Foreign Application Priority Data

Nov. 19, 1996 [JP] Japan .................................... 8-308251

[51] Int. Cl.[7] .................................. F02F 7/00; F16C 9/02

[52] U.S. Cl. ............................... 123/195 AC; 123/195 R; 123/195 A

[58] Field of Search ............................ 123/195 R, 195 A, 123/195 AC

[56] References Cited

U.S. PATENT DOCUMENTS

| | | | |
|---|---|---|---|
| 4,278,055 | 7/1981 | List et al. | 123/195 R |
| 4,474,144 | 10/1984 | Tanaka et al. | 123/195 A |
| 4,497,293 | 2/1985 | Takagi et al. | 123/195 A |
| 4,617,882 | 10/1986 | Matsumoto | 123/195 A |
| 4,674,455 | 6/1987 | Tsuboi | 123/195 R |
| 4,721,077 | 1/1988 | Fukuo et al. | 123/195 R |
| 4,753,201 | 6/1988 | Fukuo et al. | 123/195 R |
| 5,509,387 | 4/1996 | Kaminski et al. | 123/195 R |

FOREIGN PATENT DOCUMENTS

B2-3 18052 3/1991 Japan .

*Primary Examiner*—Willis R. Wolfe
*Assistant Examiner*—Jason Benton
*Attorney, Agent, or Firm*—Birch, Stewart, Kolashch & Birch, LLP

[57] ABSTRACT

To enable preventing interference between a honing machine and a journal wall, avoiding large-sizing of a cylinder block and tilting a front cylinder part so that the upper end is as low as possible in a vehicular V-type internal combustion engine wherein the front cylinder part arranged on the front side in a vehicular travel direction and a rear cylinder part arranged on the rear side in the vehicular travel direction are arranged so that they form an approximate V-shape. A front cylinder part is tilted so that the upper end is lower than that of a rear cylinder part and a bent part bent on the side distant from a central position is formed in a part corresponding to a front cylinder hole of a journal wall arranged on the side displaced from the central position between both journal walls of the front cylinder hole.

10 Claims, 3 Drawing Sheets

VEHICULAR V-TYPE INTERNAL COMBUSTION ENGINE CYLINDER BLOCK STRUCTURE

BACKGROUND OF THE INVENTION

1. Field of the Invention

The present invention relates to a V-type internal combustion engine mounted in a vehicle such as a motorcycle and, particularly relates to the engines cylinder block structure.

2. Description of Background Art

A vehicular V-type internal combustion engine wherein a front cylinder part arranged on the front side in a vehicular travel direction and a rear cylinder part arranged on the rear side in the vehicular travel direction are arranged so that they form an approximate V shape is known in Japanese published examined patent application Ser. No. H3-18052 for example and others. In such a V-type internal combustion engine, the respective center lines of front and rear cylinder holes, respectively, provided to the front cylinder part and the rear cylinder part are displaced from a central position between a pair of journal walls adjacent in the axial direction of a crankshaft.

To avoid interference with an accessory such as a radiator in the case wherein a V-type internal combustion engine is mounted in a vehicle such as a motorcycle, it is desirable that the front cylinder part is tilted so that the upper end is as low as possible. However, when the front cylinder part is greatly tilted on the front side, the lower end of the front cylinder hole provided in the front cylinder part is close to the journal wall provided in the lower part of a cylinder block and in the case where the inner surface of the front cylinder hole is honed, the journal wall interferes with a honing machine. Therefore, in the above conventional type, the tilt angle to the front side of the front cylinder part cannot be set so that it is large and the positions of the respective upper ends of the front cylinder part and the rear cylinder part are set so that they are approximately equal in height. To avoid interference between the journal wall and the honing machine, the distance between the journal walls adjacent in the axial direction of the crankshaft can be also set to a large value, however, in that case, the cylinder block, that is, the internal combustion engine is a large-size.

SUMMARY AND OBJECTS OF THE INVENTION

The present invention is made to solve the above problems and the object is to provide a cylinder block structure in a vehicular V-type internal combustion engine wherein interference between a honing machine and a journal wall is avoided without large-sizing of a cylinder block and a front cylinder part can be tilted so that the upper end is as low as possible.

To achieve the above object, the present invention is characterized in that in a vehicle V-type internal combustion engine wherein a front cylinder part arranged on the front side in a vehicular travel direction and a rear cylinder part arranged on the rear side in the vehicular travel direction which forms an approximate V-shape together with the front cylinder part are provided in a cylinder block and plural journal walls respectively provided with a semicircular bearing half part for supporting the upper half part of a crankshaft are integrated at an interval in the axial direction of the crankshaft in the lower part of the cylinder block and the center line of a front cylinder hole provided to the front cylinder part is displaced from a central position between the pair of journal walls adjacent to the axial direction of the crankshaft, the front cylinder part is tilted so that the upper end is lower than that of the rear cylinder part and a bent part bent on the side distant from the central position is formed in a part corresponding to the front cylinder hole of the journal wall arranged on the side displaced from the central position of the front cylinder hole.

According to such a construction, as a part corresponding to the front cylinder hole of the journal wall located on the displaced side of the front cylinder hole is bent on the side distant from a central position between both journal walls even if the lower end of the front cylinder hole is close to the journal wall because the front cylinder part is tilted so that the upper end is lower than that of the rear cylinder part, the journal wall can be prevented from interfering with a honing machine for honing the inner surface of the front cylinder hole and therefore, the front cylinder part can be tilted so that the upper end is as low as possible with an increasing distance between both journal walls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2 is viewed along an arrow 3.

DETAILED DESCRIPTION OF THE PREFERRED EMBODIMENTS

Hereinafter, a preferred embodiment of the present invention will be described with reference to the drawings.

Figure 1:
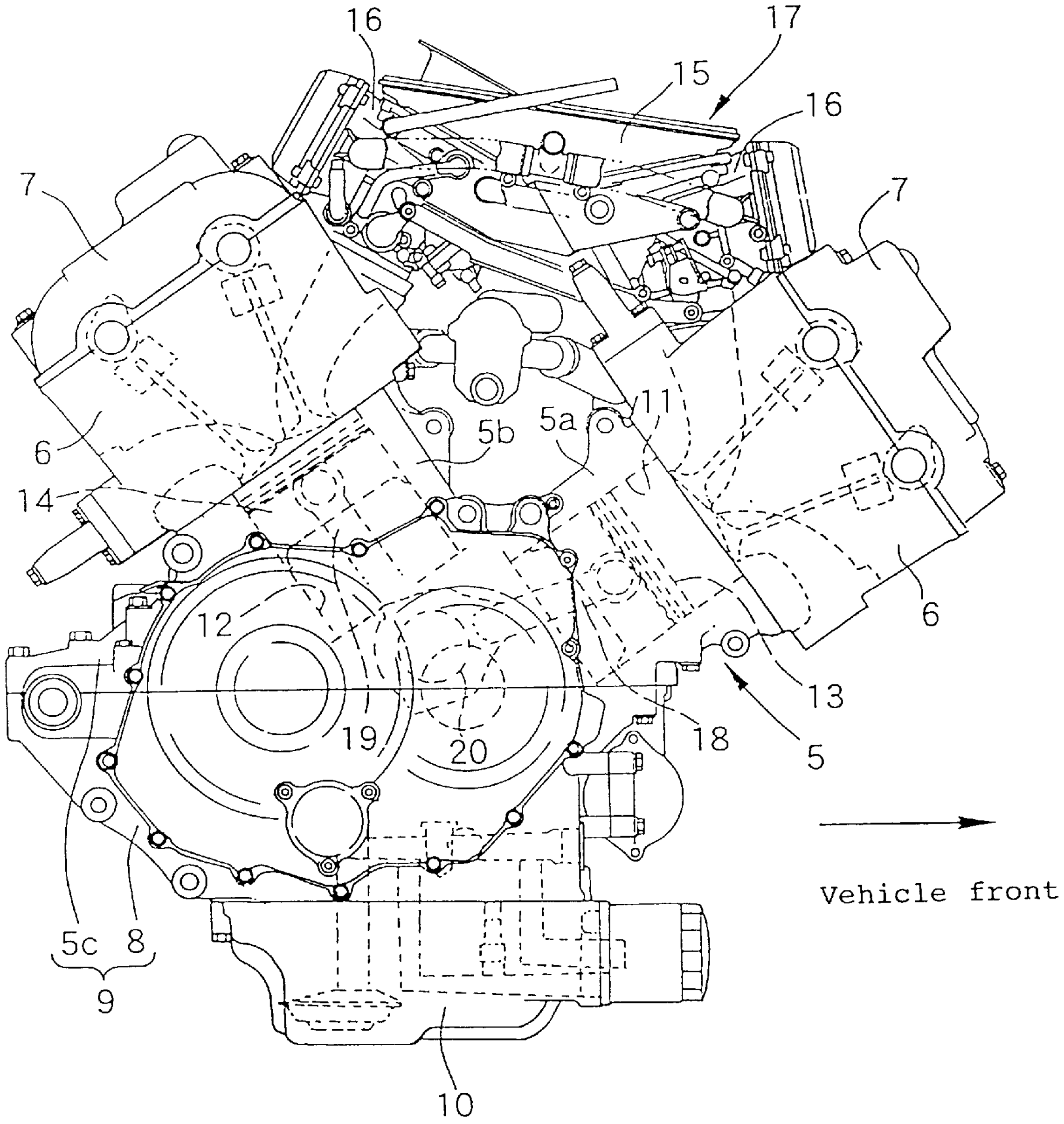
FIG. 1 is a side view showing a V-type two-cylinder internal combustion engine.
Figure 2:
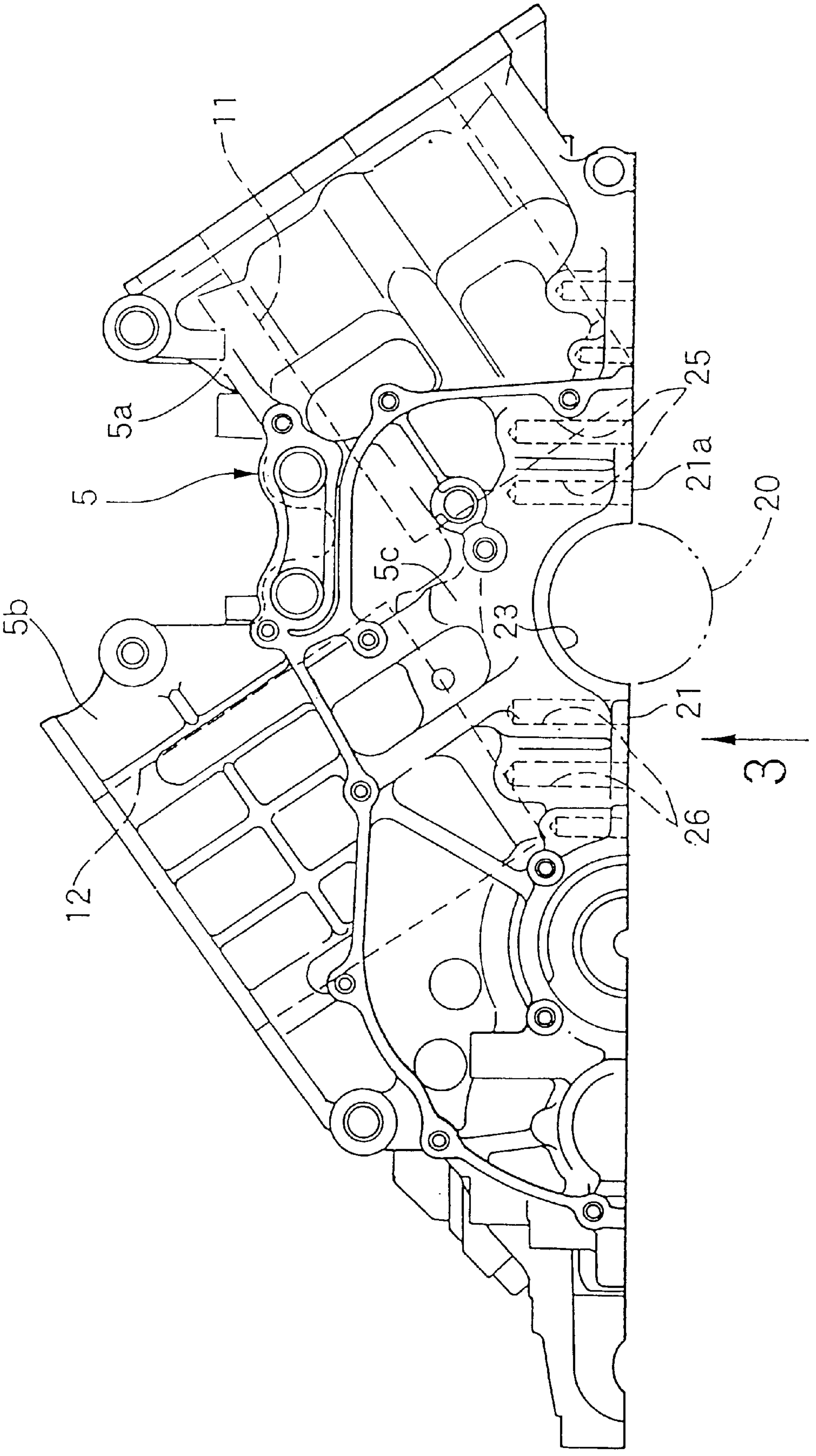
FIG. 2 is a side view showing a cylinder block.
Figure 3:
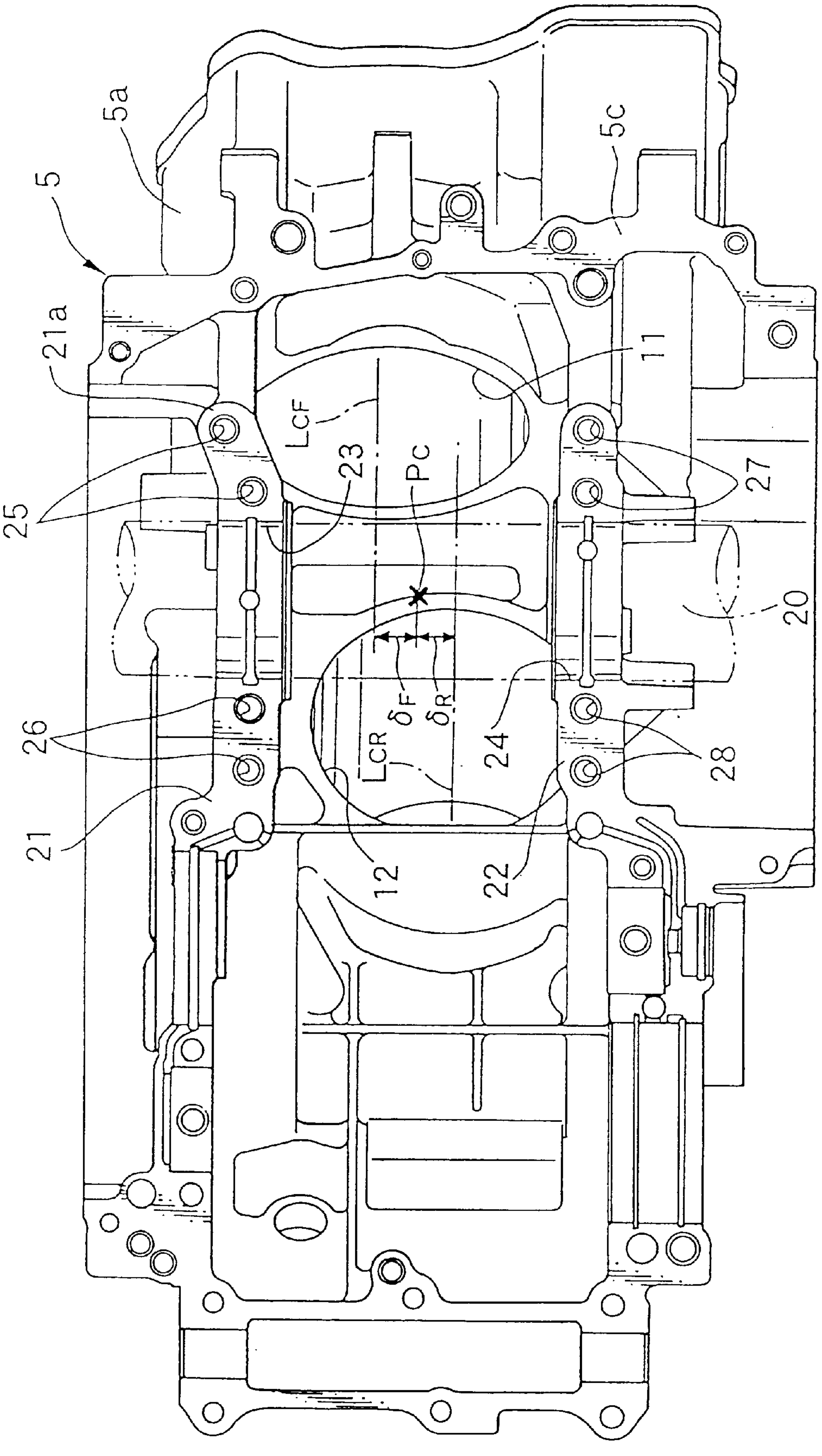
FIG. 3 is a bottom view when

FIGS. 1 to 3 show an embodiment of the present invention, FIG. 1 is a side view showing a V-type two-cylinder internal combustion engine, FIG. 2 is a side view showing a cylinder block and FIG. 3 is a bottom view when the cylinder block shown in FIG. 2 is viewed along an arrow 3 in FIG. 2.

First, the V-type two-cylinder internal combustion engine shown in FIG. 1 is mounted on a motorcycle for example, a cylinder block consisting of a front cylinder part **5*a* arranged on the front side (on the right side in FIGS. 1 and 2) in a vehicular travel direction, a rear cylinder part 5*b* arranged on the rear side in the vehicular travel direction which forms an approximate V-shape together with the front cylinder part 5*a* and an upper crankcase part 5*c* formed by connecting the respective lower parts of the cylinder parts 5*a* and 5*b*, a cylinder head 6 is connected to each upper end of both cylinder parts 5*a* and 5*b* and a head cover 7 is connected to the upper end of each cylinder head 6**.

A lower crankcase 8 is coupled to the lower part of the cylinder block 5, that is, the upper crankcase part **5*c* and a crankcase 9 include by the upper crankcase part 5***c* and the lower crankcase 8. An oil pan 10 is connected to the lower end of the crankcase 9, that is, the lower end of the lower crankcase 8.

Front and rear cylinder holes 11 and 12 are provided to the front and rear cylinder parts 5*a* and 5*b* and pistons 13 and 14 are respectively fitted into the cylinder holes 11 and 12 so that the pistons can slide therein.

An air cleaner 15 common to both cylinder parts 5*a* and 5*b* and a suction system 17 including carburetors 16 individually corresponding to both cylinder parts 5*a* and 5*b* are arranged between the front cylinder part 5*a* and the rear cylinder part 5*b*.

A crankshaft 20 shown in FIGS. 2 and 3 and coupled to both pistons 13 and 14, respectively, via connecting rods 18 and 19 is supported by the crankcase 9 so that the crankshaft can be rotated and a pair of journal walls 21 and 22, respectively, provided with semicircular bearing half parts 23 and 24 for supporting the upper half part of the crankshaft 20 are integrated in the lower part of the cylinder block 5, that is, the upper crankcase part 5*c* at an interval in the direction of the axis of the crankshaft 20. A pair of journal walls not shown, respectively, corresponding to the above journal walls 21 and 22 are provided in the lower crankcase 8 to support the lower half part of the crankshaft 20. A pair of boltholes 25 are provided to one journal wall 21 on the side of the front cylinder part 5*a* from the bearing half part 23, a pair of boltholes 26 are provided to one journal wall 21 on the side of the rear cylinder part 5*b* from the bearing half part 23, a pair of boltholes 27 are provided to the other journal wall 22 on the front cylinder part 5*a* from the bearing half part 24, a pair of boltholes 28 are provided to the other journal wall 22 on the side of the rear cylinder part 5*b* from the bearing half part 24, and a journal wall on the side of the lower crankcase 8 is fastened to each journal wall 21 and 22 by a bolt (not shown) screwed into the respective boltholes 25, 26, 27, 28.

The front cylinder hole 11 provided to the front cylinder part 5*a* is arranged so that the center line LCF is displaced by displacement quantity δF on one side along the axis of the crankshaft 20 from a central position Pc between both journal walls 21 and 22, the rear cylinder hole 12 provided to the rear cylinder part 5*b* is arranged so that the center line LCR is displaced by displacement quantity δR on the other side along the axis of the crankshaft 20 from the central position Pc between both journal walls 21 and 22, and the front cylinder part 5*a* is tilted so that the upper end is lower than the upper end of the rear cylinder part 5*b*.

In addition, a bent part 21*a* bent on the side distant from the central position Pc is formed in a part corresponding to the front cylinder hole 11 of the journal wall 21 arranged on the side displaced from the central position Pc of the front cylinder hole 11 between both journal walls 21 and 22, and the boltholes 25 on one side of the bearing half part 23 are provided to the bent part 21*a*.

Next, for an explanation of the action in this embodiment, as the upper end of the front cylinder part 5*a* arranged so that the front cylinder part form an approximate V-shape together with the rear cylinder part 5*b* is tilted so that the upper end is lower than that of the rear cylinder part 5*b* and as a result, the front cylinder part 5*a* is prevented from interfering with an accessory such as a radiator arranged in front of a V-type internal combustion engine, the degree of freedom of the layout of the V-type internal combustion engine and each accessory can be enhanced.

In addition, when the front cylinder part 5*a* is tilted so that the upper end is lower than that of the rear cylinder part 5*b*, the lower end of the front cylinder hole 11 is close to one 21 of both journal walls 21 and 22 because the center line LCF of the front cylinder hole 11 is displaced by displacement quantity δF from the central position Pc between both journal walls 21 and 22 in the axial direction of the crankshaft 20. However, as the bent part 21*a* bent on the side distant from the central position Pc is formed in the part corresponding to the front cylinder hole 11 of the journal wall 21, the journal wall 21 can be prevented from interfering with a honing machine when the inner surface of the front cylinder hole 11 is honed. In the meantime, as the rear cylinder part 5*b* is tilted so that the upper end is located in a relative high position, the lower end of the rear cylinder hole 12 is not close to the other 22 of both journal walls 21 and 22 and therefore, the journal wall 22 never interferes with the honing machine. As a result, the front cylinder part 5*a* can be tilted so that the upper end is as low as possible so as to avoid interference between the honing machine and either of the journal wall 21 or 22 without increasing the distance between both journal walls 21 and 22, and the degree of the freedom of the layout can be increased.

The embodiment of the present invention is described in detail above, however, the present invention is not limited to the above embodiment and unless various changes of design deviate from the present invention as disclosed in the claims, they are allowed.

For example, the present invention can be applied to a plural-cylinder V-type internal combustion engine including a two-cylinder one and in that case, a bent part has only to be provided to one of a pair of journal walls of every cylinder. The present invention can be also applied to a V-type internal combustion engine wherein a bearing cap is, respectively, fastened to the journal walls 21 and 22 in the lower part of the cylinder block 5.

As described above, according to the present invention, as a bent part bent on the side distant from a central position between both journal walls is formed in a part corresponding to a front cylinder hole of the journal wall located on the displaced side of the front cylinder hole even if the lower end of a front cylinder hole is close to the journal wall because a front cylinder part is tilted so that the upper end is lower than that of a rear cylinder part, the journal wall can be prevented from interfering with a honing machine for honing the inner surface of the front cylinder hole and therefore, the front cylinder part can be tilted so that the upper end is as low as possible without increasing the distance between both journal walls and the degree of the freedom of the layout can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A cylinder block structure in a vehicular V-type internal combustion engine comprising:

a front cylinder part arranged on a front side in a vehicular travel direction;

a rear cylinder part arranged on a rear side in the vehicular travel direction;

said front cylinder part and said rear cylinder part form an approximate V-shape and are provided in a cylinder block;

plural journal walls, respectively, provided with semicircular bearing half parts for supporting an upper half part of a crankshaft are integrated at an interval in an axial direction of Ltie crankshaft in a lower part of said cylinder block;

a center line of a front cylinder hole provided to the front cylinder part is displaced from a central position between a pair of journal walls adjacent along the axis or the crankshaft;

said front cylinder part is tilted so that an upper end of the front cylinder part is lower relative to an upper end of the rear cylinder part; and a bent part bent on a side distant from said central position is formed immediately adjacent to the front cylinder hole of the journal wall arranged on a side displaced from said central position of the front cylinder hole.

2. The cylinder block structure in a vehicular V-type internal combustion engine according to claim 1, wherein the tilting of the front cylinder part allows an accessory to be placed in a close proximity of said V-type internal combustion engine, said proximity being adjacent said front cylinder part.

3. The cylinder block structure in a vehicular V-type internal combustion engine according to claim 1, wherein a center line of said front cylinder part is displaced by a predetermined distance from the central position between the pair of journal walls adjacent along the axis of the crankshaft.

4. The cylinder block structure in a vehicular V-type internal combustion engine according to claim 1, wherein a center line of said rear cylinder part is displaced by a predetermined distance from the central position between the pair of journal walls adjacent along the axis of the crankshaft.

5. The cylinder block structure in a vehicular V-type internal combustion engine according to claim 1, wherein the bent part is formed in a part corresponding to the front cylinder hole of the journal wall, said bent part facilitating said journal wall in avoiding contact with a honing machine at a time the front cylinder is honed.

6. The cylinder block structure in a vehicular V-type internal combustion engine according to claim 1, wherein the rear cylinder part is tilted for positioning the upper end at a relatively high position whereas the lower end of the rear cylinder hole is displaced from the journal walls, said bent part facilitating said journal wall in avoiding contact with a honing machine at a time the front cylinder is honed.

7. The cylinder block structure in a vehicular V-type internal combustion engine according to claim 1, wherein at least one bolthole is provided through the bent part.

8. The cylinder block structure in a vehicular V-type internal combustion engine according to claim 7, wherein said at least one bolthole is two boltholes provided through the bent part.

9. The cylinder block structure in a vehicular V-type internal combustion engine according to claim 2, wherein said accessory is a radiator.

10. The cylinder block structure in a vehicular V-type internal combustion engine according to claim 1, wherein said bent part is formed along a line drawn along a tilt of the front cylinder.

* * * * *